United States Patent [19]
Kuroe

[11] 3,931,643
[45] Jan. 6, 1976

[54] MAGNETIC HEAD CLEANING TAPE CARTRIDGE FOR USE IN MAGNETIC RECORDING AND REPRODUCING APPARATUS OF THE ROTARY HEAD TYPE

[75] Inventor: Akio Kuroe, Katano, Japan

[73] Assignee: Matsushita Electric Industrial Co., Ltd., Osaka, Japan

[22] Filed: Apr. 8, 1974

[21] Appl. No.: 459,046

[30] Foreign Application Priority Data

| Apr. 6, 1973 | Japan | 48-41961[U] |
| May 22, 1973 | Japan | 48-60667[U] |
| May 23, 1973 | Japan | 48-61015[U] |
| May 23, 1973 | Japan | 48-61016[U] |
| June 15, 1973 | Japan | 48-71338[U] |

[52] U.S. Cl. .............................. 360/128; 15/210 R
[51] Int. Cl.² ................... G11B 5/41; B47L 25/00
[58] Field of Search .............. 360/128, 137; 274/47; 15/210 R

[56] References Cited
UNITED STATES PATENTS

| 3,069,815 | 12/1962 | Valentine | 15/210 R |
| 3,439,922 | 4/1969 | Howard | 15/210 R |
| 3,789,452 | 2/1974 | Nemoto | 360/128 |

Primary Examiner—Robert S. Tupper
Attorney, Agent, or Firm—Stevens, Davis, Miller & Mosher

[57] ABSTRACT

A magnetic head cleaning tape cartridge is disclosed which comprises a length of cleaning tape assembly consisting of a transparent and relatively rigid leader tape, a cleaning tape which has a layer made of fibrous materials for intimate contact with the surface of a magnetic head and has a lower transmissivity than the leader tape, and a transparent trailer tape; a supply reel around which is wrapped the cleaning tape assembly; and a cartridge case containing the reel.

7 Claims, 18 Drawing Figures

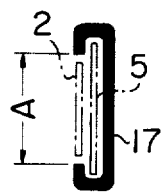
FIG. 3
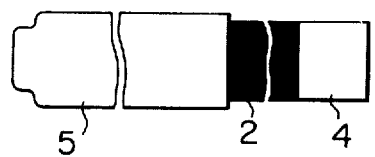
FIG. 4
FIG. 5
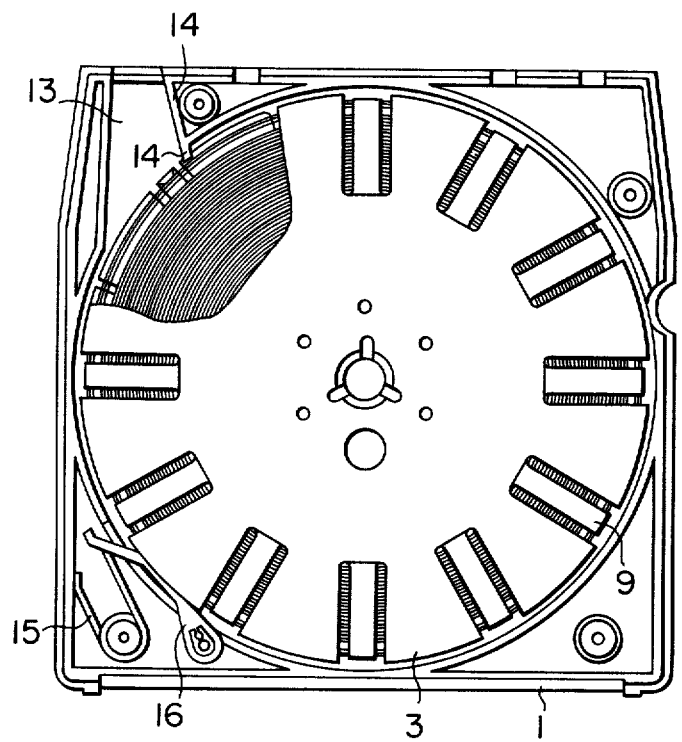
FIG. 6
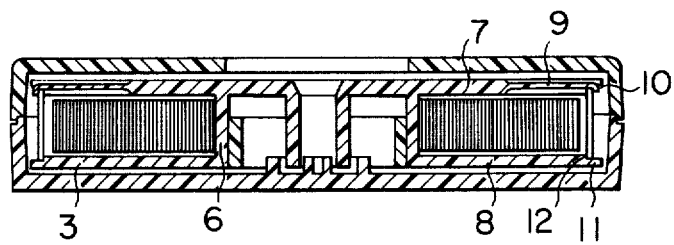

MAGNETIC HEAD CLEANING TAPE CARTRIDGE FOR USE IN MAGNETIC RECORDING AND REPRODUCING APPARATUS OF THE ROTARY HEAD TYPE

FIELD OF THE INVENTION

The present invention relates to a magnetic head cleaning tape cartridge for removing the clogging of the air gap of a magnetic head and maintaining the dust- or contaminant-free surface of the magnetic head, and more particularly a magnetic head cleaning cartridge of the type described and best adapted for use with an automatic threading type magnetic recording-reproducing system.

DESCRIPTION OF THE PRIOR ART

In the magnetic recording-reproducing systems, the air gap of a magnetic head tends to be clogged up or lodged with magnetic powder and binder removed from the magnetic tape so that the magnetic recording and playback are adversely affected. In order to overcome this problem, there has been devised and demonstrated a device as shown in FIG. 1. When a push button 1 formed integral with a mount 2 upon which is mounted a cleaning brush 3 made of, for instance, fur of a swine, is pushed, the cleaning brush 3 which is supported by a supporting member 9, is moved in the direction indicated by the arrow 10 and is placed in contact with a magnetic head 4 so that dust or contaminants 5 adhering to the magnetic head 4 may be removed. However, the magnetic head 4 is mounted upon a head mount 7 which in turn is attached upon a head bar 6 rotating in the direction indicated by the arrow 11 so that it is very difficult to choose the timing of pushing down the button 1 and to adjust the position of the cleaning brush 3 with respect to the magnetic head 4. Furthermore, there is a fear that the breakdown of the magnetic head 4 occurs due to the impact exerted from the cleaning brush 3 because the magnetic head 4 is revolving.

Another method for cleaning the magnetic heads is to wipe off the contaminants upon the surface of the magnetic head with a cloth of gauze impregnated with an organic solvent. Cleaning of the magnetic head may be carried out manually in the case of an opened type magnetic recording-reproducing system, but in the case of an automatic threading type magnetic recording-reproducing system in which a magnetic head or heads are contained in a casing, the casing must be removed for cleaning the magnetic head or heads. Furthermore, a magnetic tape guide is disposed adjacent to the magnetic head or heads along a predetermined path of the magnetic tape and conceals the magnetic head or heads so that it is impossible to attach a magnetic head cleaning device adjacent to the magnetic head.

OBJECT OF THE INVENTION

One of the objects of the present invention is therefore to provide a magnetic head cleaning tape capable of effectively removing the contaminants clogging or lodged in the air gap of a magnetic head.

Another object of the present invention is to provide a magnetic head cleaning cartridge best adapted for use with an automatic threading type magnetic recording-reproducing system.

A further object of the present invention is to provide a magnetic head cleaning cartridge which may automatically clean the surface of a magnetic head when mounted upon an automatic threading type magnetic recording-reproducing system and also may automatically rewind the cleaning tape into the cartridge.

ESSENCE OF THE INVENTION

To accomplish the above and other objects of the present invention, the present invention provides a magnetic head cleaning cartridge comprising a cartridge casing containing a reel around which is wrapped a length of a cleaning tape assembly consisting of a transparent and relatively rigid leader tape, a cleaning tape whose one surface in contact with the surface of a magnetic head comprises a fibrous layer and which has a transmissivity lower than that of the transparent leader tape, and a transparent trailer tape, all tapes being spliced together in the order named.

The above and other objects, features and advantages of the present invention will become more apparent from the following description of some preferred embodiments thereof taken in conjunction with the accompanying drawings.

BRIEF DESCRIPTION OF THE DRAWINGS

FIG. 3 is a sectional view of a leader guide for guiding the leading end of the leader tape along a predetermined path;

FIG. 4 is a schematic top view of a magnetic tape adapted for use with the system shown in FIG. 2;

FIG. 5 is a view of a first embodiment of a magnetic head cleaning cartridge with a cover removed in accordance with the present invention, the cleaning cartridge being adapted for use with the system shown in FIG. 2;

FIG. 6 is a sectional view of the cleaning cartridge shown in FIG. 5;

DESCRIPTION OF THE PREFERRED EMBODIMENTS

There has been devised and successfully demonstrated a video tape recorder of the type having a magnetic tape automatically threaded around a head drum containing rotary heads through a tape guide disposed along the head drum. In the video tape recorder of the type described, cleaning the surfaces of the rotary heads has been a serious problem since the rotary heads are concealed by the tape guide. In view of the above, the primary object of the present invention is to provide a novel magnetic head cleaning tape which may be automatically threaded around a magnetic head drum to be made in contact with the magnetic heads thereof, thereby cleaning the surface of the heads.

Figure 1:
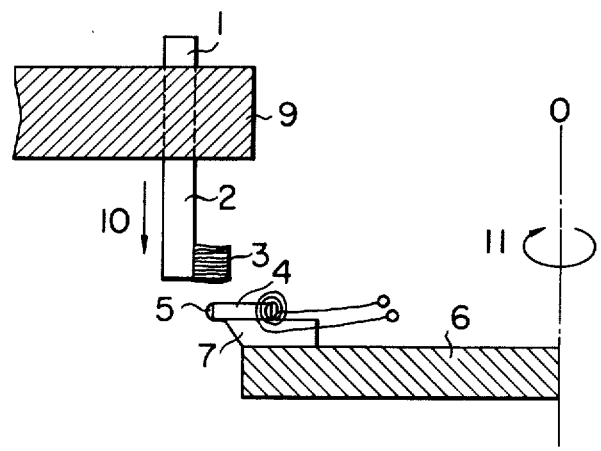
FIG. 1 is a schematic sectional view of a prior art magnetic head cleaning device.
Figure 2:
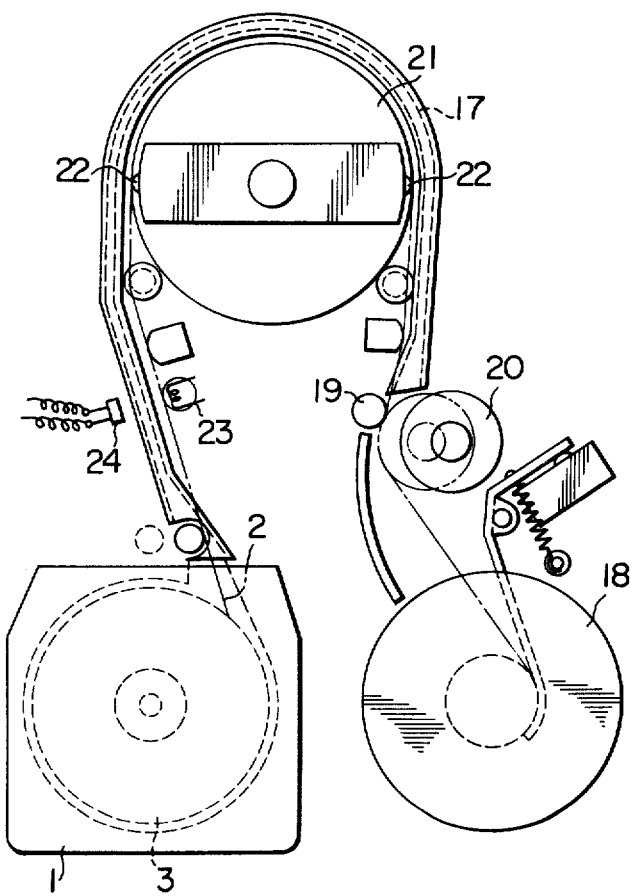
FIG. 2 is a schematic view of a video tape recorder to which is advantageously applied a magnetic head cleaning cartridge in accordance with the present invention.

Referring to FIGS. 2, 3 and 4 illustrating a video tape recorder and its tape to which may be applied the present invention, a cartridge 1 contains a reel 3 around which is wound a length of tape 2. A transparent trailer tape 4 is spliced to the end of the magnetic tape while a transparent leader tape 5, which is wider and slightly more rigid or nerve than the magnetic tape, is spliced to the leading end of the magnetic tape.

The construction of the cartridge 1 is illustrated in detail in FIGS. 5 and 6. A reel comprises a cylindrical hub 6 having a pair of flanges 7 and 8 extended from both upper and lower ends of the hub 6. The upper flange 7 has a plurality of fingers 9 which are radially outwardly and equiangularly extended and have a thickness less than that of the flange 7. Each finger 9 is provided with a pawl 10 at the leading end thereof extended downwardly toward the lower flange 8. The flanges 7 and 8 have stepped peripheral edges whose vertical surface will be referred to as the shoulder 12 and whose horizontal surface, as the step 11.

The pair of flanges 7 and 8 are spaced apart from each other by a distance slightly wider than the width of the magnetic tape but slightly smaller than the width of the leader tape 5. The distance between the finger 9 and the step 11 is substantially equal to the width of the leader tape 5. Therefore, the leader tape 5 is wound around the shoulder 12 and is elastically held between the shoulder 12 and the downwardly extended pawl 10 by the fingers 9.

The cartridge case 1 has an opening 13 through which the tape is pushed out of and fed back into the cartridge case 1. When the tape is unwound, the leading end of the leader tape 5 engages with a projection 14 disposed adjacent to the opening 13 so that it causes the pawl 10 to be moved outwardly of the flange against the elastic force of the finger, then the leading end of the leader tape 5 is released from the fingers. Thereafter, the leader tape 5 is placed in contact with a wall 14 defining the opening 13 so that it is discharged out of the cartridge case 1 under the rotational force of the reel and by the nerve or rigidity of the leader tape 5.

In case of rewinding, the leader tape 5 is caused to be wound between the steps 11 by a member 16 which is normally biased radially inwardly under the force of a spring 15.

Referring back to FIG. 2, a reference numeral 17 denotes a leader guide having an opening A which is formed through one side surface thereof and which has a width narrower than the width of the leader tape 5 but wider than the width of the magnetic tape as best shown in FIG. 3.

A take-up reel 18 is adapted to automatically catch the leader tape 5 to take up the tape by the conventional means.

A capstan 19 and a pinch roller 20, which are generally spaced apart from each other, pull or transport the tape at a constant speed in the recording or reproducing mode.

A drum 21 which contains rotary magnetic heads 22 guides the magnetic tape. A lamp 23 and a photosensor 24 are so disposed as to sandwich the tape between them. In response to the signal from the photosensor 24 which intercepts the light from the lamp 23, a tape transport system (not shown) is controlled by a suitable control means such as solenoids. When the magnetic tape 2 is interposed between the lamp 23 and the photosensor 24, the latter cannot intercept the light because the magnetic tape 2 is opaque, but when the transparent trailer tape 4 is passing between them, the photosensor 24 intercepts the light so that the tape transport system may stop taking up the tape and then start rewinding. In order to prevent the tape transport system from being actuated in response to the interception of the light by the photosensor 24 when the leading end of the transparent leader tape 5 is transported along the leader guide 17, the output signal of the photosensor 24 is transmitted to the tape transport control system (not shown) through a suitable prior art delay circuit. The delay time may be longer than a time interval from the time when the leader tape 5 is automatically taken up by the take-up reel 18 to the time when the magnetic tape 2 is interposed between the lamp 23 and the photosensor 24.

In rewinding, the photosensor 24 intercepts the light when the transparent leader tape 5 is passing between the lamp 23 and the sensor 24 so that the output signal of the photosensor 24 is transmitted to the tape transport control system through the delay circuit so as to automatically stop rewinding of the reel 3. Since the output signal is delayed, the reel 3 is prevented from being stopped while the leader tape 5 is in the leader guide 17.

Figure 7:
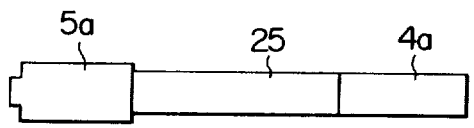
FIG. 7 is a schematic view of the arrangement of a tape contained in the magnetic head cleaning cartridge in accordance with the present invention.

FIG. 7 shows one embodiment of a head cleaning cartridge in accordance with the present invention, comprising at least a head cleaning tape 25 whose one surface in contact with a magnetic head has a layer made of fibrous materials, a transparent leader tape 5a spliced to both ends of the cleaning tape 25, and a trailer tape 4a having a high transmissivity. The leader tape 5a, which serves to guide the cleaning tape 25 over the magnetic head, is made of a thin flexible film of an organic compound such as polyethylene terephthalate of a thickness of the order of 155 microns.

Figure 8:
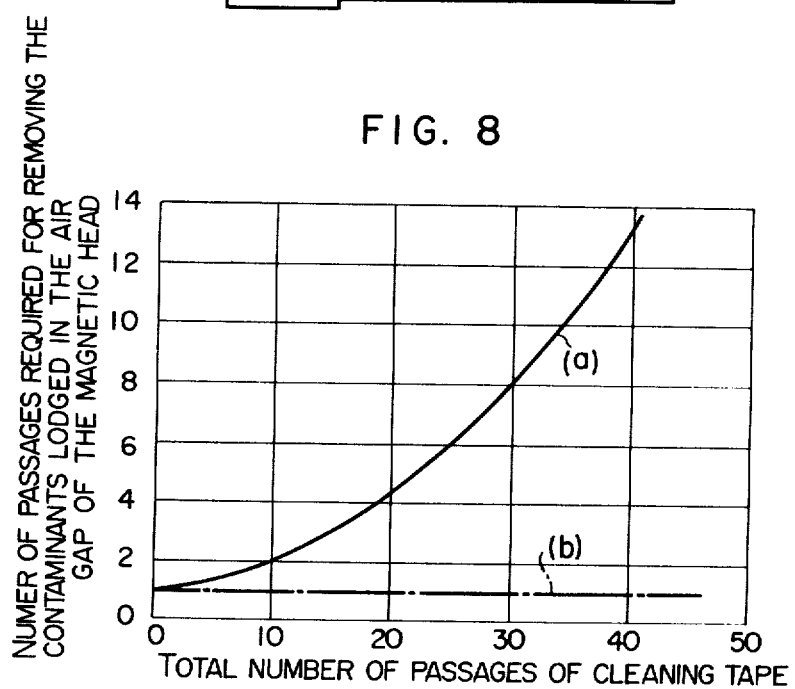
FIG. 8 is a graph illustrating the cleaning effects of a cleaning tape and a polishing tape.

FIG. 8 is a graph illustrating the magnetic head cleaning characteristics of the conventional polishing tape and the fibrous cleaning tape, that is the number of passages of the polishing and cleaning tapes to attain a satisfactory honing or cleaning of the magnetic head. The total number of passages of the cleaning tapes is plotted along the abscissa while the number of passages of the cleaning tape required for attaining a satisfactory honing is plotted along the ordinate.

The curve (a) in FIG. 8 indicates the head cleaning characteristic of the polishing tape. It is seen that the honing effect is degraded as the total number of passages is increased. In other words, satisfactory honing or cleaning of the magnetic head cannot be attained even when the polishing tape is made to pass over the head many times. However, in case of the cleaning tape made of fibrous materials, satisfactory cleaning may be attained with only one passage of the cleaning tape regardless of the total number of passages as indicated by the curve (b) in FIG. 8.

Therefore, it is seen that the fibrous cleaning tapes are very effective to remove relatively soft substances attached upon the magnetic head. The fibrous cleaning tapes are made of paper, nonwoven fabrics, and woven fabrics of coarse texture such as cotton, acetate, tetron, bemberg, silk, and hemp fabrics. However, when they are used to clean the video tape recording and reproducting system of the tape described, the satisfactory effects cannot be attained because of their inherent threadability, transmissivity, and strength as will be described in more detain hereinafter.

First, the fibrous materials must have suitable nerve or be flexible. Otherwise, the cleaning tape makes intimate contact with the head drum, and has no satisfactory strength. When the thickness of the cleaning tape is increased to provide sufficient nerve or flexibility, the transport of the cleaning tape becomes unstable, which is not desirable in practice.

According to the present invention, in order to overcome the above and other problems, a thin film made of organic material such as polyethylene terephthalate is used as a base of a cleaning tape, and a fibrous material is bonded to the base with adhesive. Therefore, the layer of fibrous material may be reduced in thickness so that the overall thickness of the cleaning tape 25 may be reduced. Furthermore, the satisfactory threadability of the cleaning tape may be ensured.

Figure 9:
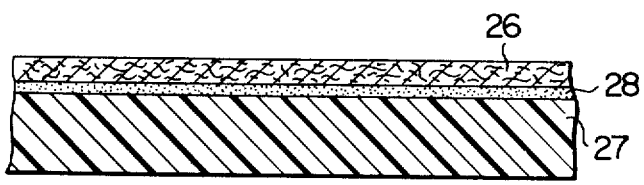
FIG. 9 is a sectional view of one embodiment of a cleaning tape in accordance with the present invention.

When the cleaning tape 25 has a sufficient transmissivity, the photosensor 24 may intercept the light from the lamp 23 so that the rewinding of the tape may be started. In order to prevent such erratic operation, the cleaning tape 25 must have a low transmissivity. For this purpose, the fibrous layer is bonded to the base with an opaque adhesive as shown in FIG. 9. Reference numeral 26 denotes the fibrous layer; 27, the base made of an organic compound such as polyterephthalate; and 28, the adhesive. The adhesives consist of a high polymer such as rubber, vinyl acetate, copolymer of vinyl chloride, polyvinyl ether, polyvinyl butyral, polyacrylate, or the like, a bulking agent such as rosin derivatives, cumarone resins or the like, and a black pigment. Furthermore, the adhesives consisting of natural components such as starch, dextrin, protein, cellulose, or the like mixed with a black pigment may be used.

Figure 10:
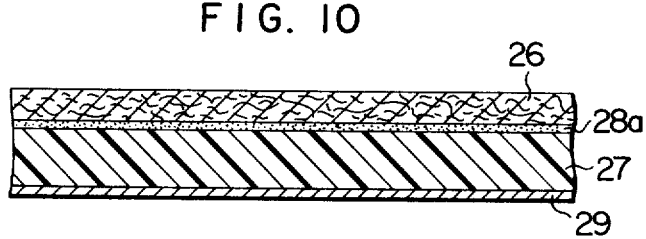
FIG. 10 is a sectional view of another embodiment of a cleaning tape in accordance with the present invention.
Figure 11A:
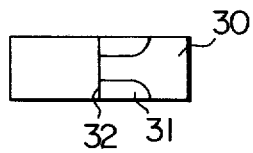
FIGS. 11A – 11D show schematically the surfaces of the magnetic head in respective cleaning steps.
Figure 11B:
Figure 11C:
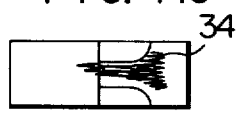
Figure 11D:
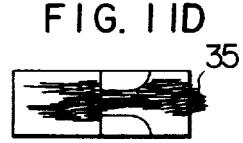

In order to reduce the transmissivity of the cleaning tape 25, an opaque layer 29 consisting of black pigment such as black carbon may be applied or deposited upon the surface of the polyethylene terephthalate base 27 opposite to the surface upon which the fibrous layer 26 is formed as shown in FIG. 10. Reference numeral 28a denotes a transparent adhesive. This arrangement has an additional advantage that the threadability or transportability of the cleaning tape is remarkably improved because the friction between the carbon black layer 29 and the tape guides, etc. is remarkably reduced.

Instead of using the adhesive 28a, the fibrous layer 26 may be welded to the base 27 by a heat-treatment. This method is advantageous in that the bonding strength between the base and the fibrous layer is much stronger than the attainable by use of an adhesive and that the overwall thickness of the cleaning tape may be considerably reduced so that the transportability of the cleaning tape may be improved. When the adhesive is used, there is a fear that the adhesive is squeezed out of the surface of the fibrous layer 26 and/or sides of the cleaning tape when the fibrous layer 26 is pressed against the magnetic head so that the air gap of the magnetic head is clogged or filled up by the adhesive. However, the above problem may be overcome when the fibrous layer is thermally welded to the base.

The cleaning tape 25 having the leader tape 5a and the trailer tape 4a spliced at the leading and trailing ends of the cleaning tape 25, respectively, is wound around the reel 3 and housed within the cartridge case 1 as shown in FIGS. 5 and 6. When the cartridge case is mounted upon the magnetic recording-reproducing system of the type described, the leader tape 5a is guided automatically through the tape guide 17 along the drum 21, and the cleaning tape 25 is transported in intimate contact with the rotary heads 22 until the transparent trailer tape is detected by the photosensor 24. Thereafter, the cleaning tape is rewound. When the transport of the cleaning tape is stopped, the trailer tape has not reached the drum and the cleaning tape, that is the fibrous layer thereof, is wrapped around the drum. Therefore, the magnetic heads are revolving in contact with the fibrous layer of the cleaning tape. In the case of the magnetic recording-reproducing system of the type in which the rotation of the magnetic heads is stopped as the trailer tape is detected, the rotation of the magnetic heads is gradually stopped as the magnetic heads are in intimate contact with the fibrous layer of the cleaning tape.

In the rewinding operation, the fibrous layer of the cleaning tape is also held in intimate contact with the magnetic heads which are revolving.

FIG. 11 schematically shows the surfaces of the magnetic head in the respective steps of the cleaning described above. FIG. 11A shows the surface of the magnetic head completely cleaned. Reference numeral 30 designates a ferrite core; 31, a glass member; and 32, a head gap. FIG. 11B shows the surface of the magnetic head when the cleaning tape is stopped as the transparent trailer tape 4a is detected in the manner described above. It is seen that the fibrous materials 33 removed from the fibrous cleaning tape are attached in large quantity upon the surface. FIG. 11C shows the surface after the cleaning tape has been rewound. The contaminants 34 or fibrous materials left over the surface are considerably reduced.

As described above, when the cleaning tape 25 is stopped in contact with the drum, the largest amount of contaminants or fibrous materials are left over the surface. When the magnetic tape is reproduced by the above head, the contaminants 34 left over the surface of the magnetic head become cores, thus resulting in the clogging of the magnetic head as indicated by 35 in FIG. 11D. The contaminants 35 are magnetic powder or particles and binder removed from the magnetic tape by the fibrous materials left over the surface of the magnetic head.

The quantity of contaminants 33 and 34 left over the surface of the magnetic head is dependent upon the types and kinds of the fibrous materials used. It was found out that of various fibrous materials such as paper, non-woven and woven fabrics of cotten, acetate, tetron, benberg, hemp, silk and so on, the silk and hemp fabrics leave the least contaminants.

With the cleaning tape having the fibrous layer consisting of silk or hemp, not only the surface of the magnetic head is cleaned but also the clogging of the air gap of the head by the materials removed from the fibrous layer may be prevented.

The clogging of the air gap of the head is also caused by the surface flaws. If the surface flaws are not removed, the magnetic tape will be damaged and the air gap will be clogged or lodged with the magnetic powder. It is therefore advantageous to use an abrasive or polishing tape to remove the surface flaws of the magnetic heads.

Figure 12:
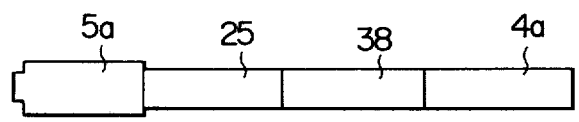
FIG. 12 is a schematic view of a further embodiment of a cleaning tape contained in the magnetic head cleaning cartridge in accordance with the present invention.

The construction of the cleaning tape adopted to remove the surface flaws of the head is shown in FIG. 12. A lapping or polishing tape 38 has a relatively low abrasion power and consists of a base and a layer of abrasives such as $\gamma$-$Fe_2O_3$ of coarse grain, chrome abrasives or carborundum for removing the surface flaws of the magnetic head. The surface of the magnetic head must be so polished as to ensure the intimate contact between the magnetic tape and the head. Therefore, the polishing tape must have a nerve substantially equal to that of the magnetic tape. The experiments conducted by the inventors showed that when the head is polished by the polishing tape of a thickness slightly thicker than the overall thickness of about 20 to 30 microns of a magnetic video tape, the satisfactory intimate contact between the magnetic video tape and the surface of the magnetic head may be ensured.

When the cleaning tape of the type shown in FIG. 12 is used, the contaminants such as magnetic particles or powder and binder which are relatively loosely attached to the surface of the magnetic head may be removed by the cleaning tape having the fibrous layer of the type described above, and the surface flaws and the contaminants which are relatively strongly adhered to the surface of the magnetic head may be removed by the polishing tape. Therefore, the clean and smooth surface may be reproduced.

The very effective cleaning effect may be attained when the cleaning tape 25 is spliced to the polishing tape 38 as shown in FIG. 12, but even when the sequence is reversed, the cleaning effect is not adversely affected at all. If required, a plurality of cleaning and polishing tapes 25 and 38 may be spliced alternately.

When the polishing tape 38 is interposed between the cleaning tape 25 and the trailer tape 4a, the polishing tape 38 remains wrapped around the head drum 21 when the photosensor 24 detects the transparent trailer tape. Therefore, the fibrous materials removed from the fibrous layer of the cleaning tape 25 may be prevented from adhering to the surface of the magnetic head. In order to prevent the cleaning tape 25 from wrapping around the drum when the photosensor 24 detects the transparent trailer tape 4a so that the transport of the cleaning and polishing tapes is stopped, a length of magnetic tape may be spliced between the cleaning tape 25 and the trailer tape 4a. Since the magnetic tape has some abrasive power, cleaning and honing of the magnetic head may be satisfactorily attained.

Figure 13A:
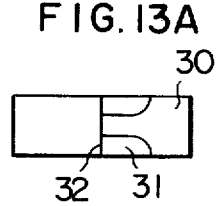
FIGS. 13A — 13C schematically show the cleaning effects attained by the cleaning tape shown in FIG. 12.
Figure 13B:
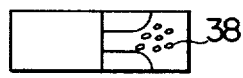
Figure 13C:
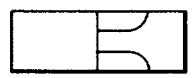

When the cleaning tape of the type shown in FIG. 12 is used, the surface of the magnetic head may be cleaned and polished as shown in FIGS. 13A–13C.

FIG. 13A shows the surface of the magnetic head before it was cleaned. FIG. 13B shows the surface cleaned when the photosensor detected the transparent trailer tape so that the transport of the cleaning tape was stopped with the magnetic tape wrapped around the drum. It is seen that small contaminants 38 are still left unremoved. FIG. 13C shows the surface further cleaned by the cleaning and polishing or magnetic tape in rewinding. It is seen that no contaminant is left over the surface of the magnetic head.

As described hereinbefore, the addition of the polishing or magnetic tape to the cleaning tape having a fibrous layer is very effective in removing the contaminants from the surface of the magnetic head. Therefore, the clogging of the air gap of the magnetic head may be prevented when the magnetic tape is wrapped around the drum. When the video signals are recorded upon the magnetic tape interconnected between the fibrous cleaning tape and the trailer tape, the cleaning effect may be immediately detected by a monitor.

In summary, the magnetic tape head may be cleaned by the fibrous cleaning tape of the type described, and the fibrous materials attached upon the surface of the magnetic tape head may be removed by the polishing or magnetic tape. When the video signals are recorded upon the magnetic tape interconnected between the fibrous tape and the trailer tape, the cleaning effect may be immediately monitored.

As described above, the fibrous cleaning tape and the magnetic tape are spliced to each other and contained within the cartridge case. Therefore, the magnetic head may be automatically and effectively cleaned and honed. The fibrous materials and binder removed from the fibrous layer of the cleaning tape by the contact thereof with the magnetic head may be prevented from adhering to the surface of the magnetic head. Furthermore, when the video signals recorded upon the magnetic tape are reproduced the conditions of the surface of the magnetic head may be immediately monitored.

What is claimed is:

1. In a magnetic recording-reproducing apparatus of a rotary having automatic threading means and automatic rewinding means in which winding of a tape is stopped before initiating the rewinding operation, a magnetic head cleaning tape cartridge, comprising:
   a. a leader tape of high light transmissivity;
   b. a cleaning tape connected to said leader tape and made of fibrous material, said cleaning tape having less light transmissivity than said leader tape;
   c. a polishing tape connected to said cleaning tape and including an abrasive material which is less abrasive than said fibrous material, said polishing tape having less light transmissivity than said leader tape;
   d. a trailer tape of high light transmissivity connected to said polishing tape;
   e. a single reel around which is wound a composite tape including said leader, cleaning, polishing and trailer tapes; and
   f. a cartridge case rotatably housing said single reel therein;
   g. the length of said leader, cleaning, polishing, and trailer tapes being such that said polishing tape is located on the rotary head when said composite tape is stopped before initiating the rewinding operation.

2. A magnetic head cleaning tape cartridge as defined in claim 1 wherein said cleaning tape further comprises a thin-film tape, made of organic compounds, on one side of which said fibrous material is bonded.

3. A magnetic head cleaning tape cartridge as defined in claim 2 wherein said cleaning tape further comprises an adhesive, mixed with a substance of less light transmissivity than said leader tape, which bonds said fibrous material to said thin-film tape.

4. A magnetic head cleaning tape cartridge as defined in claim 2 wherein said cleaning tape further comprises a layer of less light transmissivity than said leader tape connected to the other side of said thin-film tape.

5. A magnetic head cleaning tape cartridge as defined in claim 1 wherein said polishing tape comprises a magnetic tape having prerecorded video signals.

6. A magnetic head cleaning tape cartridge as defined in claim 1 wherein the fibrous material of said cleaning tape is silk.

7. A magnetic head cleaning tape cartridge as defined in claim 1 wherein the fibrous material of said cleaning tape is hemp.

* * * * *